United States Patent
Hahn

(10) Patent No.: US 10,175,472 B2
(45) Date of Patent: Jan. 8, 2019

(54) INFLATABLE LIGHT-CONCENTRATING MIRROR PROVIDED WITH A TENSIONING SYSTEM

(71) Applicant: Harry Kurt Hahn, Ettlingen (DE)

(72) Inventor: Harry Kurt Hahn, Ettlingen (DE)

(73) Assignee: SATTLER AG, Gössendorf (AT)

( * ) Notice: Subject to any disclaimer, the term of this patent is extended or adjusted under 35 U.S.C. 154(b) by 0 days.

(21) Appl. No.: 14/418,012

(22) PCT Filed: Aug. 1, 2013

(86) PCT No.: PCT/AU2013/000867
§ 371 (c)(1),
(2) Date: Jan. 28, 2015

(87) PCT Pub. No.: WO2014/019031
PCT Pub. Date: Feb. 6, 2014

(65) Prior Publication Data
US 2015/0205095 A1 Jul. 23, 2015

(30) Foreign Application Priority Data
Aug. 1, 2012 (AU) .............................. 2012903284

(51) Int. Cl.
*E04B 7/14* (2006.01)
*G02B 7/183* (2006.01)
(Continued)

(52) U.S. Cl.
CPC ............ *G02B 26/0825* (2013.01); *E04B 7/14* (2013.01); *E04D 5/00* (2013.01); *F24J 2/045* (2013.01);
(Continued)

(58) Field of Classification Search
CPC .......... G02B 7/04; G02B 7/026; G02B 7/021; G02B 7/023; G02B 7/022; G02B 7/183;
(Continued)

(56) References Cited

U.S. PATENT DOCUMENTS 3,342,192 A * 9/1967 Tombari .................. E04H 15/42
135/136
4,432,342 A * 2/1984 Lucas ...................... F24J 2/145
126/570
(Continued)

FOREIGN PATENT DOCUMENTS

FR 2568991 A 2/1986
WO WO 91/14955 A1 10/1991
(Continued)

OTHER PUBLICATIONS

International Search Report issued in PCT/AU2013/000867, dated Sep. 19, 2013.

*Primary Examiner* — Bumsuk Won
*Assistant Examiner* — Henry Duong
(74) *Attorney, Agent, or Firm* — Birch, Stewart, Kolasch & Birch, LLP

(57) ABSTRACT

An inflatable light concentrating mirror (10) comprising a first transparent sheet (1) and a second reflective sheet (2), wherein the first sheet and second sheet are connected or sealed to each other, whereby a void is provided therebetween, the void being adapted to receive a gas so as to inflate the light concentrating mirror, characterized in that the mirror further comprises tensioning means (14) adapted to produce a defined longitudinal tension (11) in at least the second sheet (2) such that wrinkles or creases therein are significantly reduced. The tensioning means comprises one or more tensioning devices (14) adapted to be attached to at least one mirror end or one free end of the second sheet, the
(Continued)

tensioning device is configured to provide a pulling force (11) on the second sheet so as to provide the longitudinal tension.

26 Claims, 11 Drawing Sheets

(51) Int. Cl.
| | |
|---|---|
| *G02B 26/08* | (2006.01) |
| *E04D 5/00* | (2006.01) |
| *F24J 2/04* | (2006.01) |
| *F24J 2/14* | (2006.01) |
| *F24J 2/50* | (2006.01) |
| *G02B 5/10* | (2006.01) |
| *E04H 15/20* | (2006.01) |
| *F24J 2/52* | (2006.01) |

(52) U.S. Cl.
CPC ............... *F24J 2/145* (2013.01); *F24J 2/505* (2013.01); *G02B 5/10* (2013.01); *G02B 7/183* (2013.01); *E04H 2015/203* (2013.01); *F24J 2002/5286* (2013.01); *Y02B 10/20* (2013.01); *Y02E 10/44* (2013.01); *Y02E 10/45* (2013.01)

(58) Field of Classification Search
CPC ........ G02B 26/0825; G02B 5/10; F24J 2/045; F24J 2/145; F24J 2002/5286; F24J 2/505; E04B 7/14; E04H 2015/203; E04D 5/00
USPC ........................................................ 359/846
See application file for complete search history.

(56) References Cited

U.S. PATENT DOCUMENTS

| | | | | |
|---|---|---|---|---|
| 4,493,313 | A |  | 1/1985 | Eaton |
| 4,543,945 | A | * | 10/1985 | Hattan ................... F24J 2/125 |
| | | | | 126/584 |
| 5,660,644 | A |  | 8/1997 | Clemens |
| 6,243,928 | B1 | * | 6/2001 | Powell ..................... F16B 2/02 |
| | | | | 24/297 |
| 6,915,677 | B1 | * | 7/2005 | Tolomeo ............ G02B 26/0825 |
| | | | | 343/915 |
| 7,997,264 | B2 |  | 8/2011 | Sankrithi |
| 2004/0055594 | A1 |  | 3/2004 | Hochberg et al. |
| 2009/0178669 | A1 |  | 7/2009 | Bronstein et al. |
| 2009/0260620 | A1 |  | 10/2009 | Winger et al. |
| 2011/0114083 | A1 |  | 5/2011 | Pedretti |
| 2011/0162637 | A1 | * | 7/2011 | Hahn ....................... F24J 2/07 |
| | | | | 126/600 |

FOREIGN PATENT DOCUMENTS

| | | | |
|---|---|---|---|
| WO | WO 2010/017594 | A1 | 2/2010 |
| WO | WO 2012/033841 | A1 | 3/2012 |

\* cited by examiner

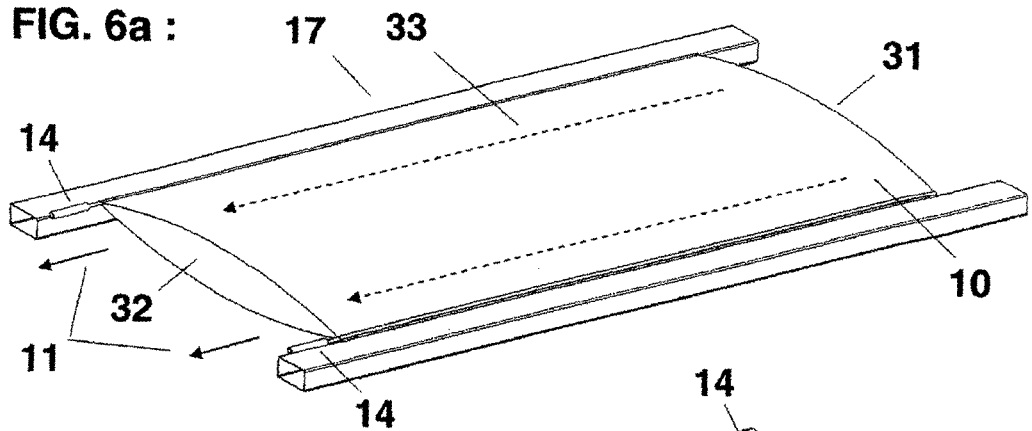
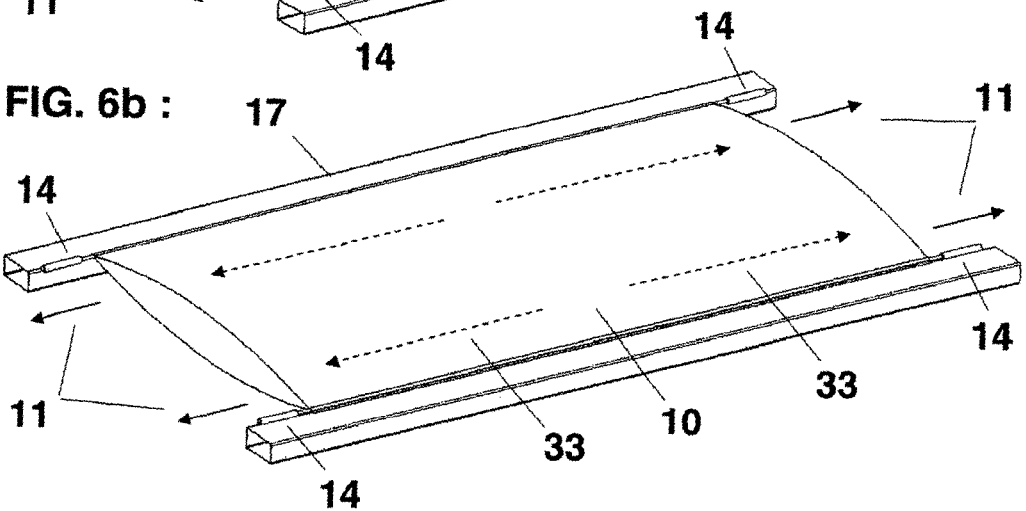
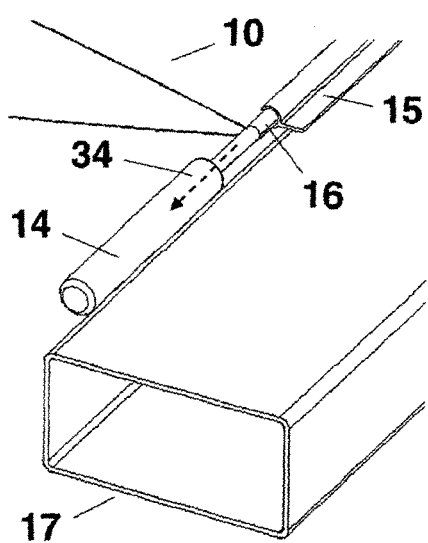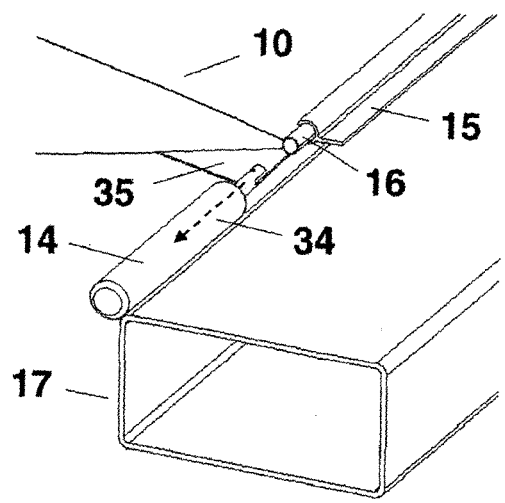

INFLATABLE LIGHT-CONCENTRATING MIRROR PROVIDED WITH A TENSIONING SYSTEM

The present invention in particular relates to an inflatable mirror for concentrating electromagnetic radiation such as radiation from the sun.

BACKGROUND OF THE INVENTION

The inflatable light-concentrating mirror in accordance with the invention is a device for concentrating electromagnetic radiation such as radiation from the sun on a focal line. There is a number of patents existing, which refer to inflatable mirrors. And all inventions of inflatable mirrors which are intended to be used in the field of solar power generation show a number of disadvantages, which disqualify them for an economical and reliable long term application for power generation.

Therefore it was the goal of this invention to develop an inflatable mirror which meets all requirements for an economical and reliable longterm use: low wind drag coefficient, high stability, UV-resistance, economical to build, to assemble and to service, favourable distribution of forces, a constant and precise control and adjustment of the air pressure in the air or gas enclosed in the inflatable mirror, prevention of condensation and pollution on the inside of the mirror etc.

SUMMARY OF THE INVENTION

This inflatable mirror is similar to the parabolic trough mirror version described in the following published patent application: US2011162637 (USA) or in EP2386047 (EPO) However its optical quality and resulting efficiency is considerable better (in the order of 20 to 30%) because creases and wrinkles in the mirror sheet are significantly reduced.

The main advantages of the inflatable light-concentrating mirror are as follows:

Nearly no creases & wrinkles in the reflective sheet through the controlled tensioning of the reflective sheet in the longitudinal direction (→compensation of uni-axial stress in mirror sheet by tensioning in perpendicular direction), a very low wind drag coefficient of only around 0.05 when the mirror is arranged in a horizontal orientation, the mirror is made of light-weight and low-cost components which are easy to produce, it is easy to handle, store or transport, it is easy to assemble, and the inflatable mirror (→the foil assembly) is easy to change in the case of damage, or if it worn out after a long time.

The range of application of the inflatable light-concentrating mirror:

The most interesting application of the inflatable mirror is its use in solar power plants for the production of heat energy and/or electrical energy (e.g. by the use of (watercooled) LGBC photovoltaic cells→for light concentration factors of 40.times.-100.times.), in small stand-alone residential- or in large scale industrial applications.

A very interesting and economical application is the simultaneous use of the inflatable mirror as roof element and light concentrating mirror (e.g. on large roof structures of factories, storehouses, hangars, halls, car parks etc.). In this application a receiver is automatically guided along the path of the moving focusline of the fixed (static) mirror.

BRIEF DESCRIPTION OF THE DRAWINGS

FIGS. 6a to 6d are views of an connection of the inflatable light concentrating mirror and tension device;

DETAILED DESCRIPTION OF THE INVENTION

Figure 1A:
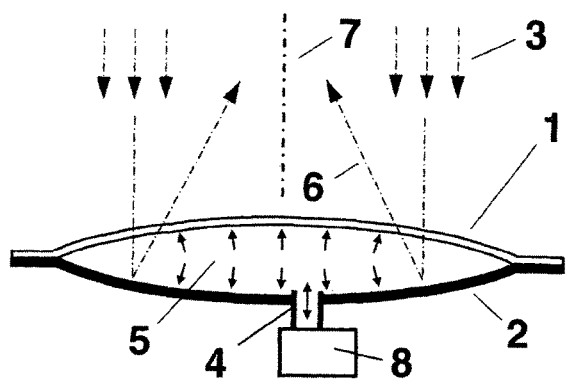
FIG. 1a is a cross section inflatable light concentrating mirror.
Figure 1B:
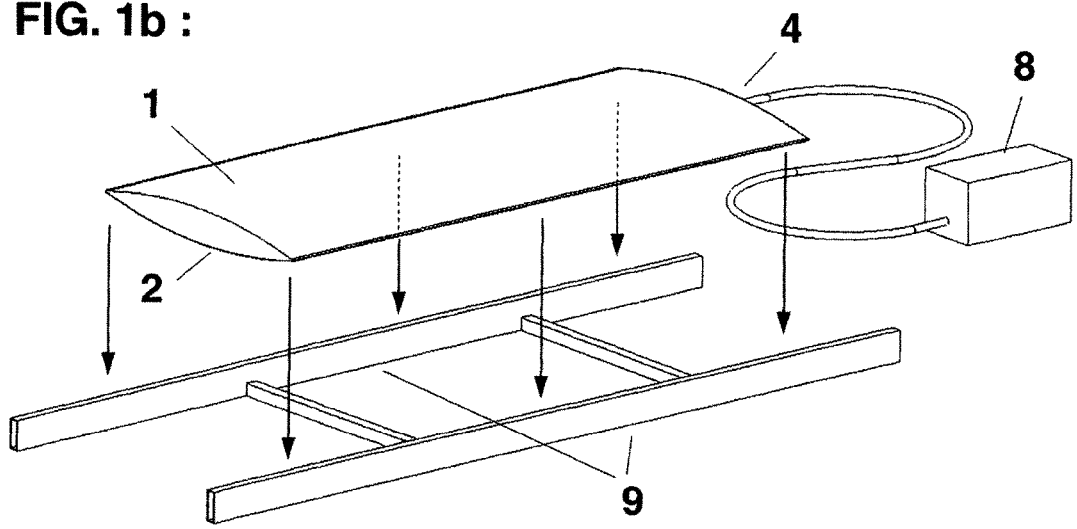
FIG. 1b and FIG. 1c are exploded views of the inflatable light concentrating mirror.

FIG. 1a:

The inflatable light concentrating mirror in accordance with the invention comprises two sheets, one of the two sheets being transparent 1 and the other sheet 2 being reflective. The two sheets are connected or sealed to each other, whereby a void is provided therebetween. The void being adapted to receive a gas 5 so as to inflate and form the light concentrating mirror. When inflated the reflective sheet of the inflatable mirror may assume shape which is close to a parabolic-trough mirror shape.

FIG. 1b:

The light concentrating mirror may further comprise means for inflating or deflating the mirror 8 by adjusting the pressure in the gas, which is enclosed in the void, and wherein the means for inflating or deflating 8 may comprise a device for the generation of a defined gas pressure in the gas which is enclosed in the void.

The device for the generation of a defined pressure may comprise an automatic device, which may be constantly or temporarily in communication with the void such that a defined overpressure is automatically generated and maintained in the gas enclosed in the void. This defined overpressure in the gas corresponds to only a few mbar overpressure above ambient air pressure, and for a precise adjustment of this overpressure, a precise differential pressure sensor for a small pressure range is required.

FIG. 1c:

The inflatable mirror may further comprise two longitudinal sides 12 which may be adapted to be each attached to a support structure 9 (e.g. two support beams or a support frame) adjacent thereto, such that the two sides of the mirror are movable in a longitudinal direction.

The inflatable light concentrating mirror may further comprise tensioning means 14 which are adapted to produce a defined longitudinal tension 11 in at least the reflective sheet 2, in such a way that wrinkles and creases therein are significantly reduced. Wherein the tensioning means 14 may comprise one or more tensioning devices which may be adapted to be attached to a support structure 9, and to at least one end of the inflatable mirror 10. And wherein the tensioning device may further be configured to provide a defined pulling force 11 on at least the reflective sheet 2, so as to provide the longitudinal tension.

The two longitudinal sides 12 of the mirror which are adapted to be attached to a support structure 9, may be attached to this support structure with a detachable connection. This detachable connection provides a rigid and secure fixing of the two longitudinal sides or rims 12 of the inflatable mirror, but also allows to move the two sides or rims of the mirror in a longitudinal direction.

Figure 2A:
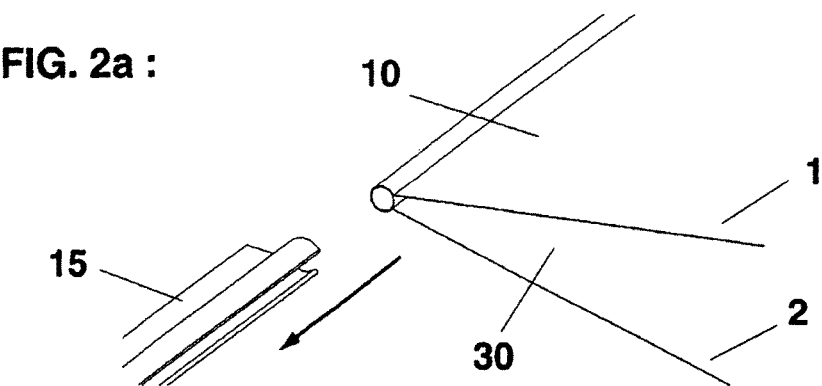
FIGS. 2a to 2d are detailed views of the connection of the inflatable light concentrating mirror and profile bar.
Figure 2B:
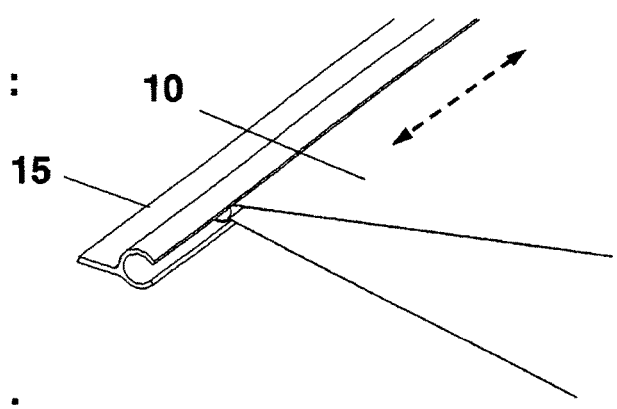
Figure 2C:
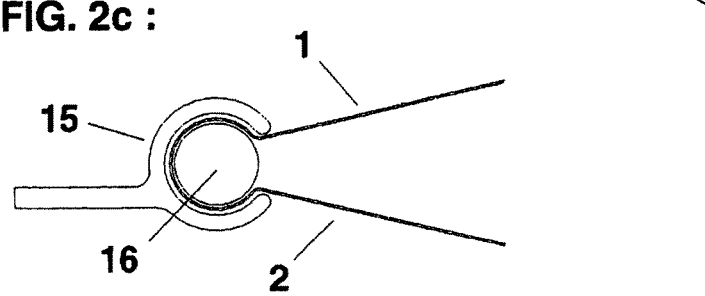
Figure 2D:
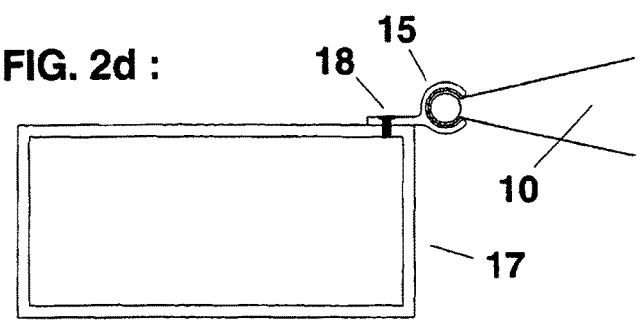

FIGS. 2a to 2c:

For this detachable connection between the inflatable mirror and the support structure, a profile bar 15 may be used, which has a special form-fit cross-section shape (e.g. a C-shaped cross-section) on the side, which holds the rim 12 (or the longitudinal side) of the inflatable mirror (→e.g. sail track profile UA 1608). This profile bar 15 may either be permanently or detachably fixed to the support structure of the mirror, or it may be an integral part of the support structure. Further a rope, a bar, or a rope- or bar-like part 16 may be used for this detachable form-fit connection, which is located along each of the two longitudinal sides 12 (or rims) of the inflatable mirror, either inside or outside of the inflatable mirror 10. In the case where it is located inside the inflatable mirror, this rope, bar, or rope- or bar-like part 16 may either be completely loose, fixed only on one end of the longitudinal side of the mirror, fixed to both ends of the longitudinal side of the mirror, or completely fixed all along the longitudinal side 12 (or rim) of the mirror.

Figure 3A:
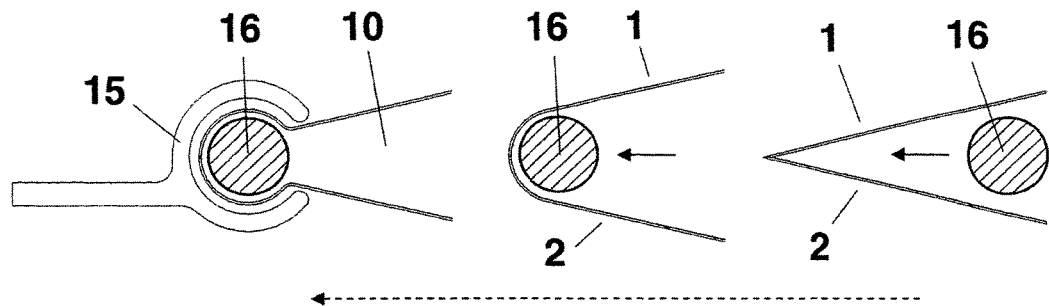
FIGS. 3a to 3d are cross section views of the connection of the inflatable light concentrating mirror and profile bar.
Figure 11A:
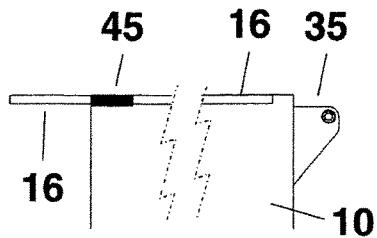
FIGS. 11a to 11f are side views of the inflatable mirror having a flap connected to a support.
Figure 11B:
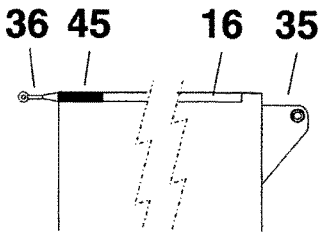
Figure 11C:
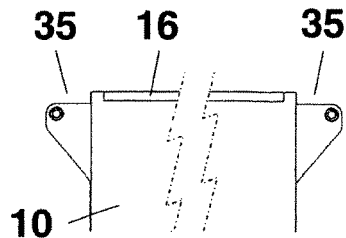

FIG. 3a and FIG. 11C:

When a loose rope, bar, or rope- or bar-like part 16 is used, it must be first pushed towards the rim (or longitudinal side) of the inflatable mirror (FIG. 3a) during the installation of the mirror, in order to allow the assembly of the form-fit connection between the mirror and the C-shaped profile 15. Then the rim (or longitudinal side) of the inflatable mirror 10 can be slid into the C-shaped profile by starting on one end of the C-shaped profile 15 (FIG. 2a). And by pulling the mirror 10 in longitudinal direction through the opening on the end of the C-shaped profile bar 15, the rim of the inflatable mirror 12, including the rope, bar, or rope- or bar-like part 16, can then completely be slid into the C-shaped profile 15 in order to form the detachable form-fit connection.

FIGS. 3a to 3c and 11a & 11b:

To make the installation of the inflatable mirror easier, a rope, bar, or rope- or bar-like part 16 may be used, which is fixed 45 on one end of the longitudinal side 12 (rim) of the inflatable mirror 10. Then the rim of the mirror with the rope, bar, or rope- or bar-like part 16 can be slided into the C-shaped profile bar 15 much easier.

The fixing of the rope, bar, or rope- or bar-like part on the end of the longitudinal side (or rim) of the mirror may be done either by gluing or by using a welding process.

FIGS. 3a to 3d and FIGS. 11d to 11f:

When the rope, bar, or rope- or bar-like part 16 is fixed 45 either to both ends of the longitudinal side (or rim) of the mirror, or completely fixed all along the longitudinal side of the mirror, then this rope, bar, or rope- or bar-like part 16 may be made of material which is extensible (elastic) under tension in order to allow an easy stretching of the inflatable mirror 10 in longitudinal direction, if a pulling force is applied to the inflatable mirror in a longitudinal direction.

Figure 3B:
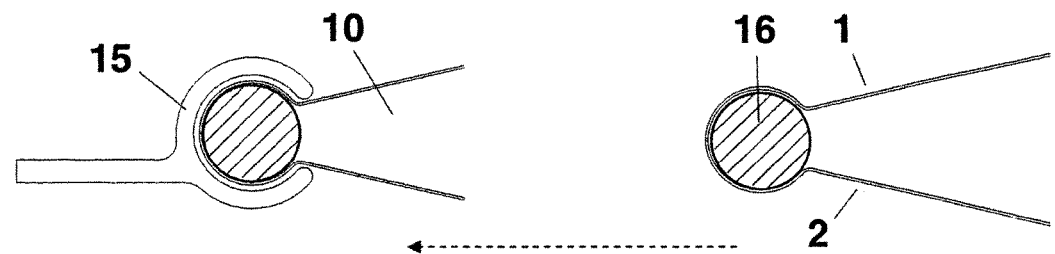
Figure 3C:
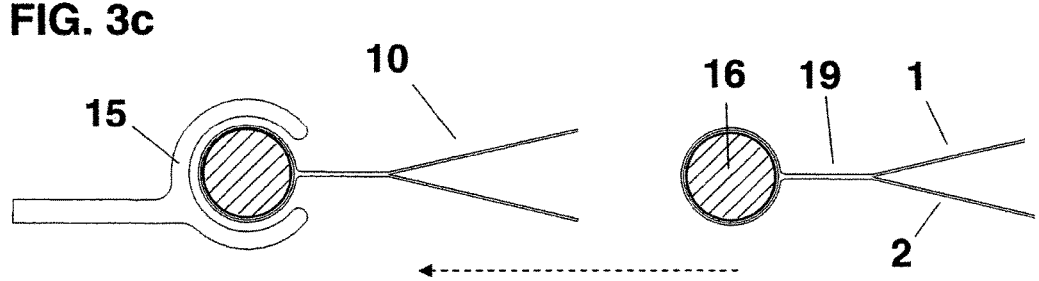
Figure 3D:
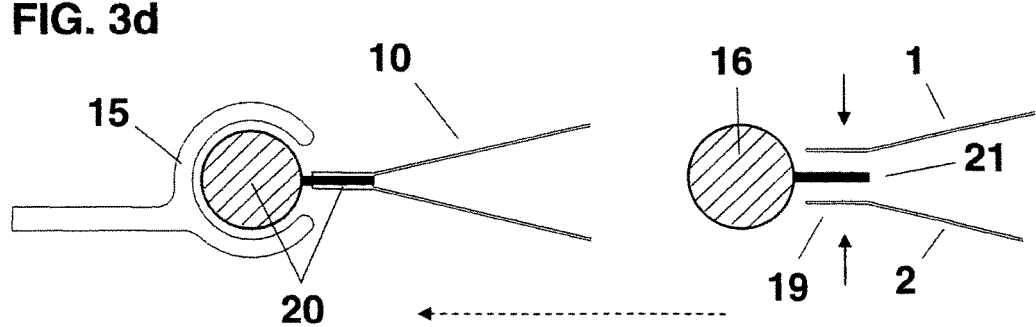

FIGS. 3b to 3d:

In the case where the rope- or bar-like part 16 is completely fixed all along the longitudinal side (or rim) of the mirror, the rope, bar, or rope- or bar-like part 16, which is made of an elastic material with a defined elasticity, may either be fixed on the inside of the inflatable mirror 10 by using a gluing- or welding-process, or it may be fixed on the outside of the inflatable mirror 10, by using an elastic rope- or bar-like part with a flap- or strap-like extension 20 on one side, which gets fixed to the longitudinal side of the transparent sheet 1 and reflective sheet 2 of the inflatable mirror 10 during the manufacturing of the mirror, by using a gluing- or welding process 19 (FIG. 3d).

Because the static friction in the described detachable form-fit connection between the inflatable mirror 10 and the C-shaped profile bar 15 increases with the length of the inflatable mirror and the length of the form-fit connection, this kind of connection can only be used up to a certain length of the inflatable mirror module, in order to guarantee an even stretching of the longitudinal side or rim 12 of the inflatable mirror, inside the C-shaped profile bar 15.

For longer inflatable mirror modules (>8-10 m), a detachable form-fit connection with a lower friction factor may be used, to allow a relatively even stretching of the longitudinal side 12 (or rim) of the inflatable mirror over the full length of the mirror. This can be achieved by using a detachable form-fit connection where only rolling resistance (rolling drag) occurs.

Figure 4A:
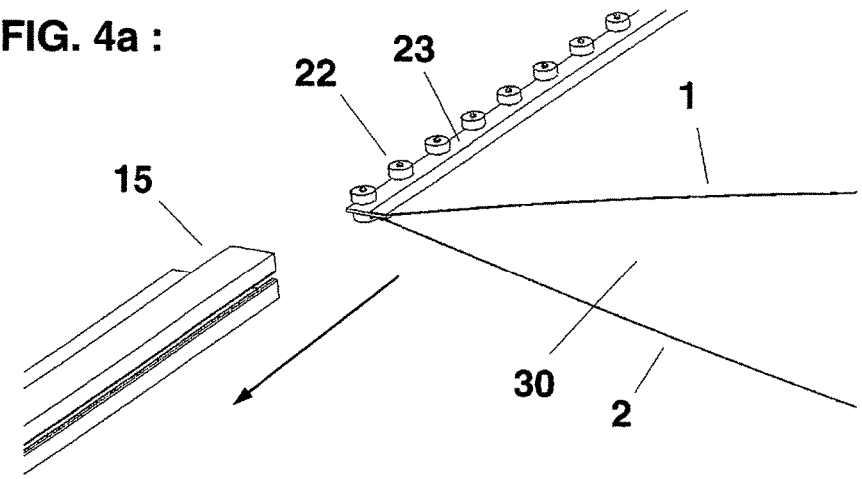
FIGS. 4a to 4c are detailed views of an alternative connection of the inflatable light concentrating mirror and profile bar.
Figure 4B:
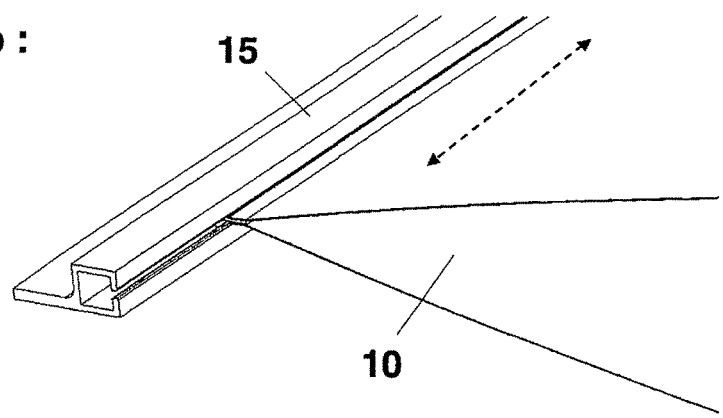
Figure 4C:
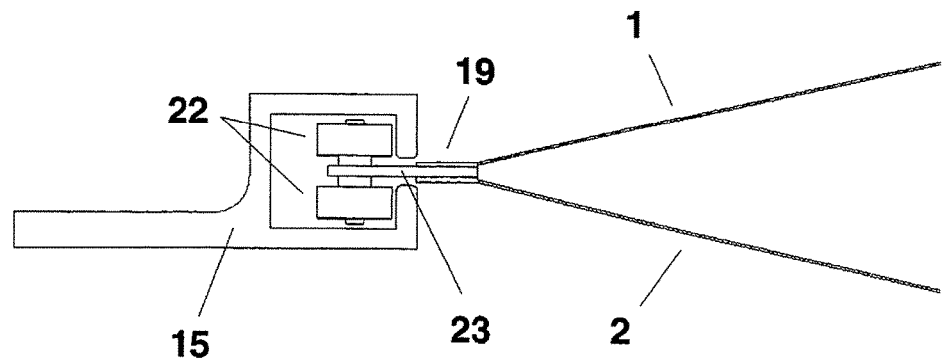

FIGS. 4a to 4c:

For this an elastic bar or an elastic strap 23 (with defined elasticity) may be used which is fixed all along the longitudinal side 12 (or rim) of the mirror and which partly protrudes from the rim of the inflatable mirror 10. For the fixing of this elastic bar or elastic strap on the rim of the mirror a gluing- or welding-process 19 may be used.

On the part of the elastic bar or elastic strap 23, which protrudes from the rim of the inflatable mirror, rollers 22 may be fixed either on one side or on both sides of the bar or strap. These rollers 22 may be fixed in defined constant distances along the elastic bar or elastic strap 23. And the profile bar 15, where the inflatable mirror gets attached to, may have a C-shaped cross section with a rectangular shape on the side which holds the rim 12 (or longitudinal side) of the inflatable mirror 10. This C-shaped profile bar 15 may again be either permanently or detachably fixed to the support structure 9 of the mirror, or it may be an integral part of the support structure 9.

FIG. 5a:

In order to make the fixing of the inflatable mirror 10 easier, the profile bar 15 with the C-shaped cross section which holds the rim of the mirror may have a hook-like shape on the mounting side 24 where it gets attached to the support beam or to the support frame 17. In this way the rims 12 (or longitudinal sides) of the inflatable mirror can already be slided into the C-shaped profiles 24 (26) during the production process of the inflatable mirror. And on site during the final assembly, when the inflatable mirror gets attached to the support structure 9, the hook-like-shaped mounting side 24 of the profile bar only needs to be hooked in on the hook-like counterparts 25. And as soon as the mirror gets inflated, the rims of the inflatable mirror 12 are pulled towards the longitudinal axis 13 of the mirror and the hook-connection gets tight and save.

Figure 5A:
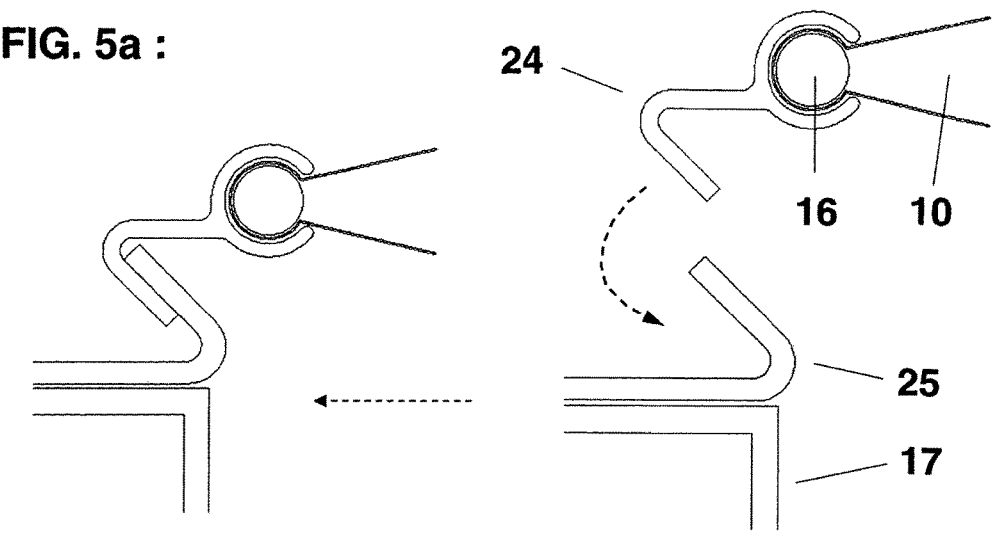
FIGS. 5a to 5f are detailed views of a connection of the inflatable light concentrating mirror and support frame.
Figure 5B:
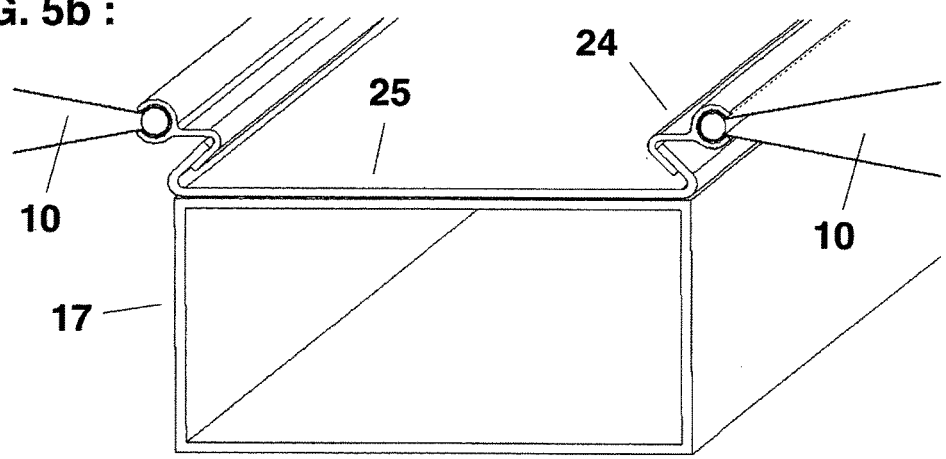
Figure 16:
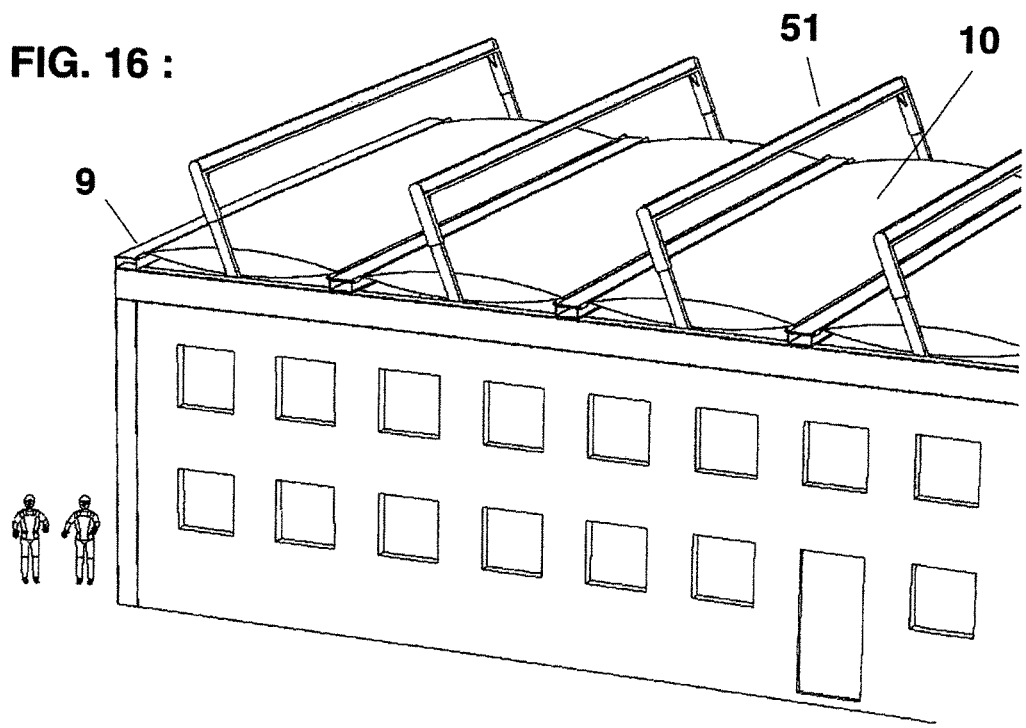
FIG. 16 depicts mirrors attached to the roof of a building.

FIG. 5b (& FIG. 1a & FIG. 16):

If the inflatable mirror 10 is used in a fixed (motionless) application, e.g. where the inflatable mirror is used as a fixed roof element, and where only the receiver 51 for the reflected light 6 moves and is guided along the path of the focusline of the mirror over daytime, then two mirrors may be fixed on the same support beam 17 or support frame.

FIG. 5c:

Another way to make the fixing of the inflatable mirror 10 easier may be the usage of a profile bar with a C-shaped cross section on one side and a cross-section with another form-fitting shape on the other side 26 (the mounting side). Here the form-fitting shape on the mounting side can have different shapes. In the shown design version the chosen form-fit cross-section on the mounting side has a T-shape. And the counterpart 27 which is fixed to the support structure 9 (e.g. to a support beam 17 or a support frame), or which is an integral part of it, has the corresponding counter shape. In the chosen design version it has a rectangular C-shape in which the T-shaped mounting side of the profile bar 26 fits in.

FIG. 5d:

And another way to make the fixing of the inflatable mirror easier may be the usage of a hinge-shaped profile bar which is lockable (e.g. with a catch) which forms a C-shaped cross-section when closed 28, on the side of the profile bar which holds the rim of the inflatable mirror. By using such a lockable hinge-shaped profile bar 28 the inflatable mirror hasn't to be slided into the C-shaped profile anymore. The complete rim (longitudinal side) 12 of the inflatable mirror can now be moved into the open C-shaped profile at one go. And the hinge-shaped profile can then be locked by just pushing down the top side of the hinge-shaped profile bar, when the rim of the inflatable mirror is in the correct position. This hinge-shaped profile bar may either be permanently or detachably fixed to the support structure of the inflatable mirror 9 (17), or it may be an integral part of the support structure. In the case where it is detachable fixed, this hinge-shaped profile bar may have a hook-like shape on the mounting side 28 where it gets attached to the support 25 (17) (9) (→same fixing principle as already described in FIG. 5a or 5b).

Figure 5C:
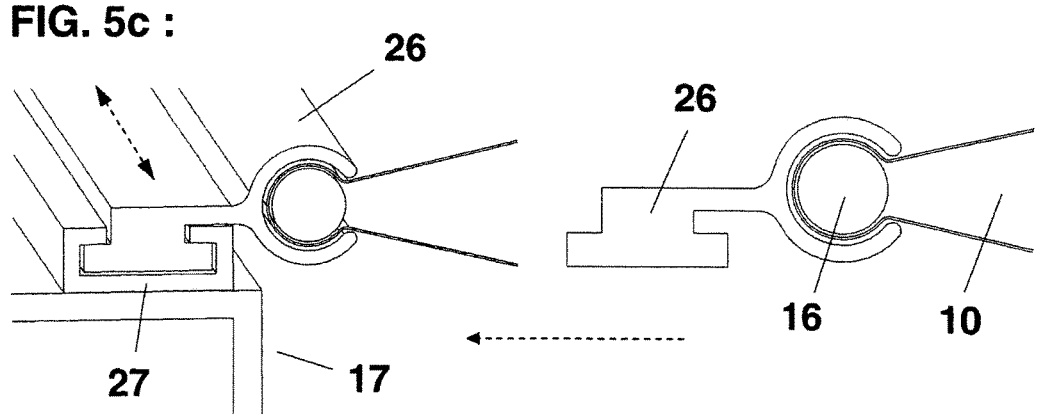
Figure 5D:
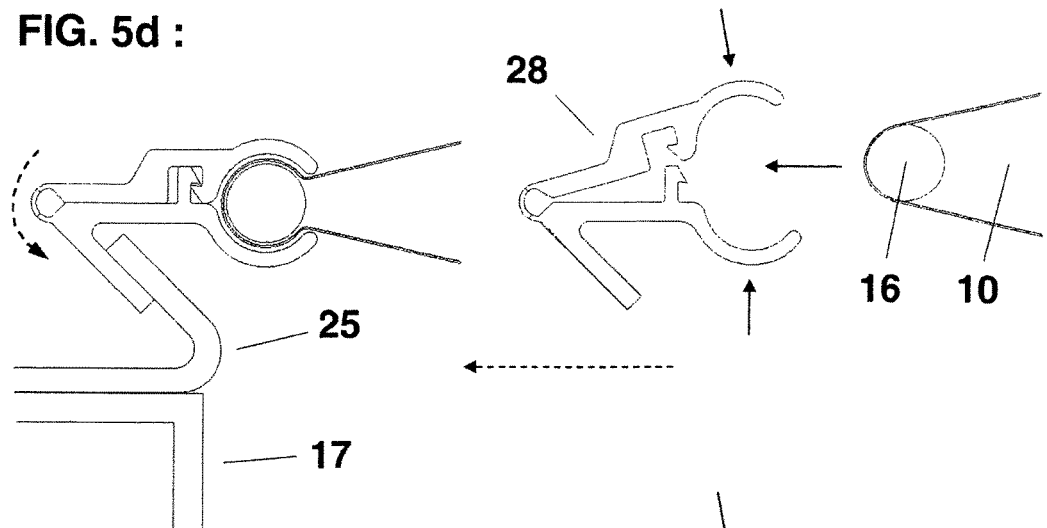
Figure 5E:
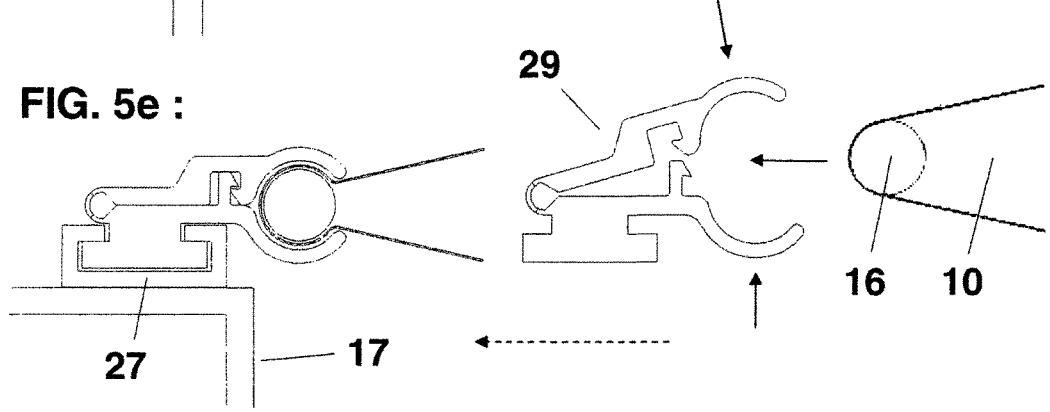
Figure 5F:
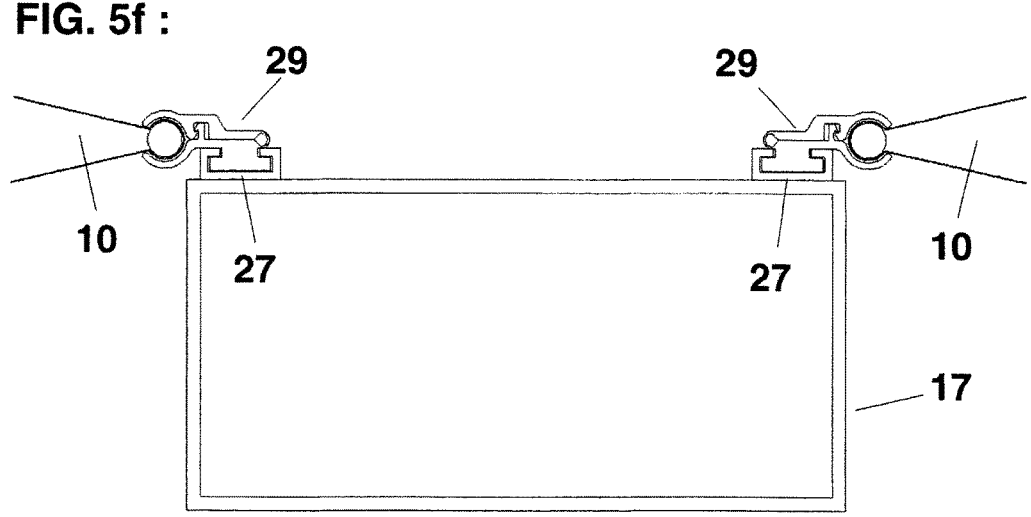
Figure 7A:
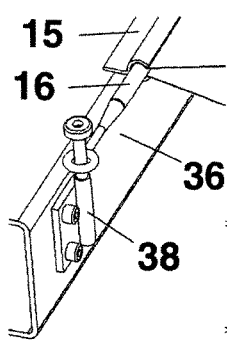
FIGS. 7a to 7d depict the detachment of the inflatable light concentrating mirror and support structure.
Figure 7B:
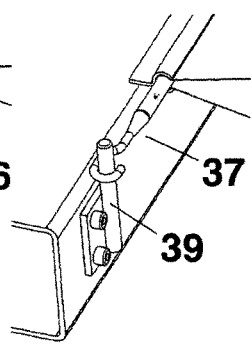
Figure 7C:
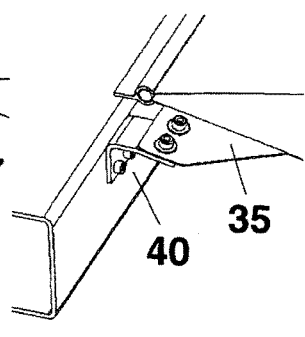
Figure 7D:
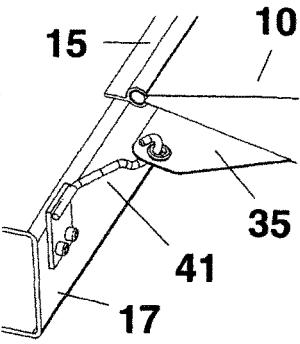

FIG. 5e:

Or the profile bar with the hinge-shape may have a cross-section with another form-fitting shape (e.g. a T-shape) on the mounting side 29. And the counterpart 27 which is fixed to the support structure, or which is an integral part of it, has the corresponding counter shape (e.g. a rectangular C-shape→same fixing principle as shown in FIG. 5c).

FIG. 5f:

And if the inflatable mirror is used in a fixed arrangement (→as described for FIG. 5b), then two inflatable mirrors 10 may be fixed on the same support beam 17 by using either the mounting principle described in 5d or in 5e.

Figure 1C:
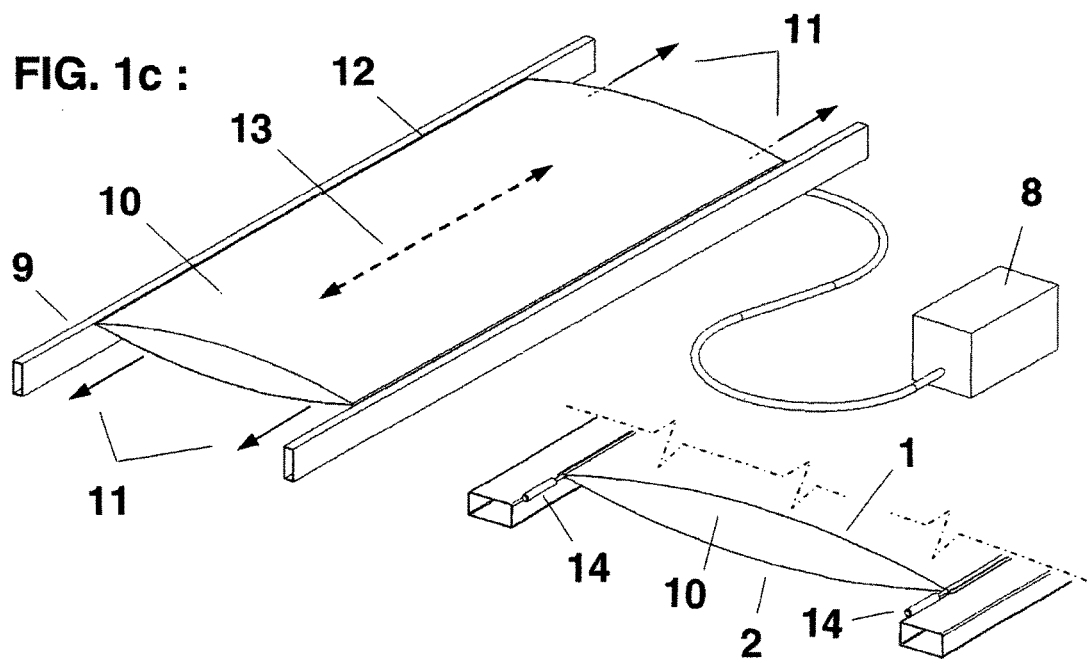

In order to significantly reduce wrinkles or creases in the reflective sheet 2 of the inflatable mirror, tensioning means 14 are used which are adapted to produce a defined longitudinal tension 11 in at least the reflective sheet of the inflatable mirror. (FIG. 1c) These tensioning means (for example special tensioning devices) for the tensioning of the reflective sheet 2, may either be located only on one end of the inflatable mirror or they may be located on both ends (front- and rear end 31 & 32) of the inflatable mirror.

FIG. 6a:

In the case where tensioning devices 14 are only used on one end (e.g. on the front end 32) of the inflatable mirror, the tensioning devices may be made in such a way that they can produce a defined pulling force 11 (tensile force) which can stretch the reflective sheet 2 over its full length 33. Or in other words the tensioning devices can produce a tensile force which can overcome the static friction between the rim 12 of the inflatable mirror and the C-shaped profile 15 over the full length of the mirror 10.

There may be two tensioning devices attached at adjacent opposing corners of the mirror end. And the other end of the inflatable mirror (the rear end 31) where no tensioning devices are used, is firmly fixed to the support structure 17 (9) in this case. Because the friction increases with the length of the inflatable mirror, in the form-fit connection between the rim of the inflatable mirror 12 and the C-shaped profile 15, this arrangement, with tensioning devices 14 only on one end of the inflatable mirror, only works up to a certain length (approx. 6-8 m) of the inflatable mirror 10.

FIG. 6b:

In the case where tensioning devices 14 are used on both ends of the inflatable mirror, the tensioning devices may be made in such a way that they can produce a tensile force (pulling force) 11 which can stretch 33 at least half of the reflective sheet 2, or in other words, which can overcome the static friction between the rim 12 of the inflatable mirror and the C-shaped profile 15 over at least half the length of the form-fit connection and which can keep at least half of the reflective sheet under tension.

In this way the tensioning devices 14 on both ends of the inflatable mirror together can stretch the inflatable mirror 10 over its full length and keep the whole reflective sheet under tension 11 along its longitudinal axis.

Having tensioning devices on both ends of the inflatable mirror allows to build longer mirror modules because the tensioning devices 14 only have to overcome half of the static friction in the form-fit connection and only have to stretch and tension half of the reflective sheet 2. In this way mirror modules with approx. 12 to 16 m length can be realized with static friction in the form-fit connection between the rim 12 of the inflatable mirror and the C-shaped profile bar 15.

In principle there are two simple ways for fixing the tensioning devices 14 in order to create the required tension in the sheet with the reflective surface:

FIG. 6c:

The required tension 34 (11) in the sheet with the reflective surface 2 may be created by a tensioning device which is fixed with one side to the end of an intermediate member, which can be a rope, bar, or rope- or bar-like part 16 fixed on each of the two longitudinal sides 12 (or rims) of the inflatable mirror, and which is fixed with the other side to the support structure 17 (9) of the inflatable mirror 10.

FIG. 6d:

Or the tension in the sheet with the reflective surface 2 may be created by a tensioning device 14 which is fixed with one side to the end of an intermediate member, which can be a flap-like extension or flap-like addition 35 on the sheet with reflecting surface 2, and which is fixed with the other side to the support structure of the inflatable mirror 10.

FIGS. 8a, 8b and 9a, 9b (7b):

The detachable connection between the tensioning device 14 (42) (43) and the end of the rope, bar, or rope- or bar-like part 16, or between the tensioning device and the flap-like extension or flap-like addition 35 on the sheet with reflecting surface 2, may be done with a detachable hook & eyelet connection 36 (37).

FIG. 7*d*:

In the case where tensioning devices are used only on one end of the inflatable mirror the mounting of the other fixed (or stationary) end of the inflatable mirror may also be done with a hook & eyelet connection (35/41). Or the mounting of the fixed (stationary) end of the mirror may be done by using one of the following mounting methods.

FIG. 7*a*:

The mounting of the fixed end of the inflatable mirror may alternatively be done with a screw which is fixing an eyelet, which is located at the end of the rope, bar, or rope- or bar-like part 36. The screw may be fixed on a bracket which comprises a thread insert or a threaded sleeve 38. And the bracket is fixed to the support structure of the mirror.

FIG. 7*b*:

Or a hook located at the end of the rope, bar, or rope- or bar-like part 37 which hooks in an eyelet or stud on a bracket 39 may be another way to mount the fixed end of mirror.

FIG. 7*c*:

Another method for mounting the fixed end of the inflatable mirror may be the use of a flat bracket 40 to which the flap-like extension or flap-like addition 35 of the sheet with the reflecting surface can be fixed (or clamped) to, with screws, bolts or rivets etc.

For both cases, where tensioning devices are used either on both ends of the inflatable mirror or only on one end of the inflatable mirror, there are different combinations of fixing methods possible to fix the inflatable mirror, either on both sides to tensioning devices or on one side to tensioning devices and on the other side to a support structure.

Figure 11D:
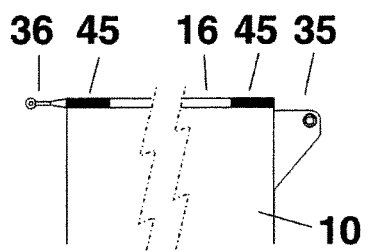
Figure 11E:
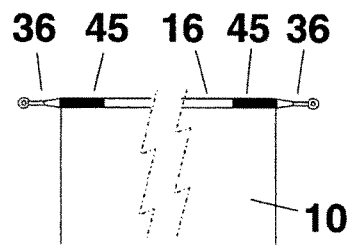
Figure 11F:
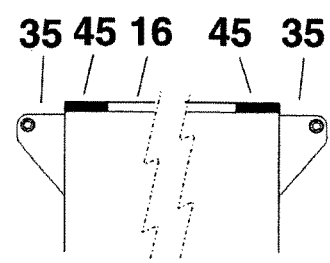

In the following an overview shall be given of possible combinations of fixing methods which may be used:

FIG. 11*c* and FIG. 11*f*:

Both ends of the inflatable mirror may have flap-like extensions or flap-like additions 35 on the sheet with reflecting surface, which may be fixed to the tensioning devices, or to the tensioning devices and the support structure of the inflatable mirror 10 by using hook & eyelet connections.

FIG. 11*b* and FIG. 11*d*:

One end of the inflatable mirror may have flap-like extensions or flap-like additions 35 on the sheet with reflecting surface, which may be fixed with hook & eyelet connections, and the other end of the inflatable mirror 10 may have eyelets which are located at the protruding ends of the rope, bar, or rope- or bar-like parts 36 which are fixed on each of the two longitudinal sides 12 (rims) of the inflatable mirror 10.

FIG. 11*e*:

Or both ends of the inflatable mirror 10 may have eyelets 36 which are located at the protruding ends of the rope, bar, or rope- or bar-like parts 16, and which are fixed with hook & eyelet connections to the tensioning devices, or to the tensioning devices and to (brackets on) the support structure.

FIG. 11*a*:

Or one end of the inflatable mirror 10 may have flap-like extensions or flap-like additions 35 on the sheet with reflecting surface, which may be fixed with hook & eyelet connections, and the other end of the inflatable mirror may just have protruding ends of the rope, bar, or rope- or bar-like parts 16 which may be fixed by a clamp connection.

In the following a description of possible tensioning devices shall be given:

In principle the tensioning device has the task to keep the sheet with the reflective surface under defined tension in longitudinal direction to reduce wrinkles and creases.

Figure 8A:
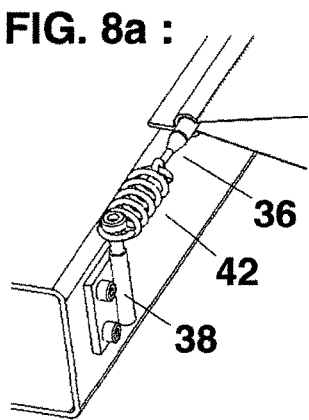
FIGS. 8a and 8b depict the detachment of an alternative connection between the inflatable light concentrating mirror and support structure.
Figure 8B:
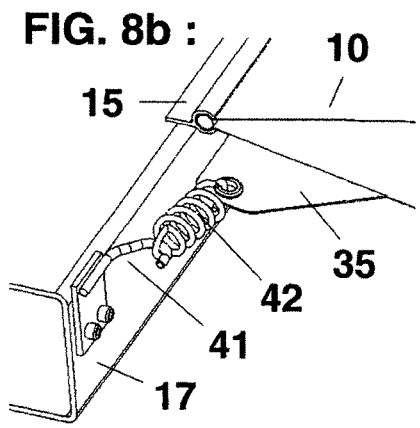

FIGS. 8*a* and 8*b*:

The device for tensioning of the sheet with the reflecting surface may simply be a tension spring 42. One side of this tension spring may be hooked in an eyelet at the end of the rope, bar, or rope- or bar-like part 36, which is located along the rim (longitudinal side) of the inflatable mirror, or it may be hooked in an eyelet on a flap-like extension or flap-like addition 35 on the sheet with the reflecting surface. And the other side of the tension spring may be hooked in a stud, hook or eyelet (not shown) on a bracket which is fixed to the support structure of the inflatable mirror 38/41.

Beside a tension spring also a compression spring could be used as a tensioning device in a special arrangement and in combination with other parts, for the tensioning of the sheet with the reflective surface. (→not shown!).

Figure 9A:
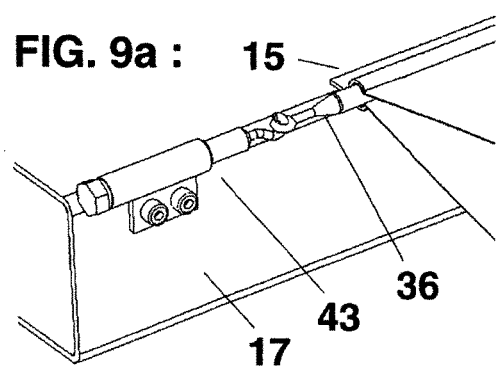
FIGS. 9a and 9b depict the detachment of an alternative connection between the inflatable light concentrating mirror and support structure.
Figure 9B:
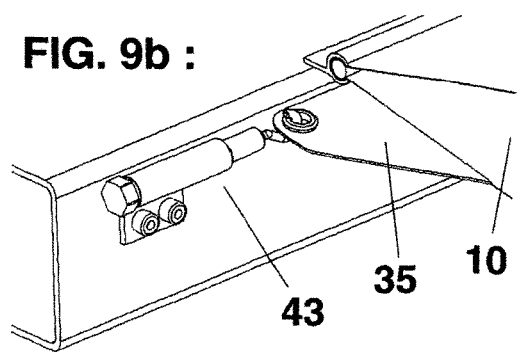
Figure 10A:
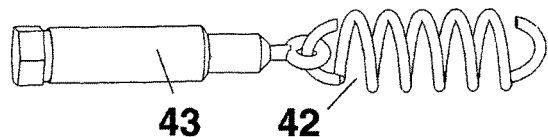
FIGS. 10a and 10b depict the device for tensioning the sheet with the reflective surface.
Figure 10B:
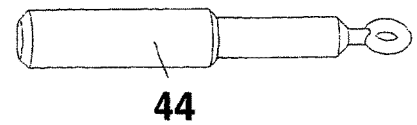

FIGS. 9*a* and 9*b*:

Or the device for tensioning of the sheet with the reflecting surface may be a device which comprises a screw mechanism 43. One side of this device may again be hooked in an eyelet at the end of the rope, bar, or rope- or bar-like part 36 which is part of the rim of the inflatable mirror 10, or it may be hooked in an eyelet on a flap-like extension or flap-like addition 35 on the sheet with the reflecting surface. And the other side of the tensioning device may directly be fixed, or fixed with the help of a bracket, to the support structure of the inflatable mirror 17 (9), by using screws, bolts or rivets.

FIG. 10*a*:

Alternatively the device for tensioning the sheet with the reflective surface may comprise one or more (a combination) of a screw mechanism 43, a tension-spring 42, or a compression spring.

FIG. 10*b*:

Or the device for tensioning the sheet with the reflective surface 2 may be a remote controlled linear actuator, e.g. a hydraulic- or pneumatic cylinder, a spindle drive or an electro magnetic driven actuator etc. 44.

This would allow an automatic adjustment of the tension in the sheet with the reflective surface in longitudinal direction (parallel to the longitudinal axis) of the inflatable mirror. For example to compensate a length expansion or length retraction of the inflatable mirror, which can be caused by temperature changes in the surrounding area etc.

Because in the described (simple) design variants, the tensioning devices produce (or induce) the pulling force (tensile force) only on the ends of the rims (or longitudinal sides) of the inflatable mirror and because of the mirror shape, the center area of the reflective sheet which is close to the end of the sheet, requires additional support in order to ensure the correct parabolic trough shape of the reflective sheet in this area.

Figure 12A:
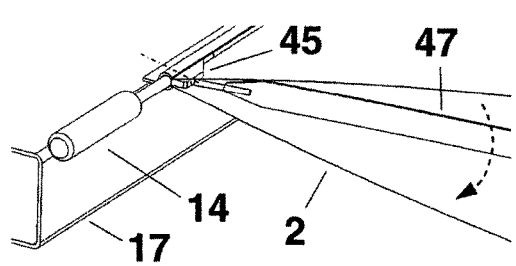
FIGS. 12a and 12b depict are perspective views of the inflatable mirror connected to a support.
Figure 12B:
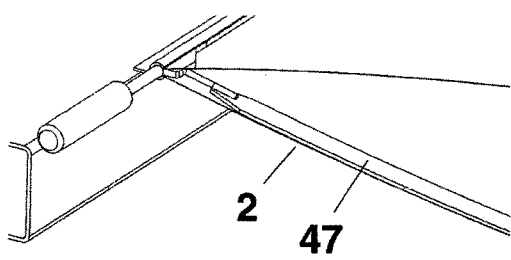

This can be achieved by one of the following measures:

FIG. 12*a* and FIG. 12*b*:

The reflective sheet 2 may be supported at each end by a bow-shaped elongated member which has a pivot on each end 47. The pivots of this bow-shaped support member may be inserted in fixing points 45 at the ends of the rope, bar, or rope- or bar-like parts 16 located along the two rims (or longitudinal sides) of the inflatable mirror. Before the final assembly of the inflatable mirror the bow-shaped support members 47 would be tilted into the main plane of the mirror (FIG. 12*a*) to reduce the required storage space of the inflatable mirror. And during the final assembly of the mirror the bow-shaped support members would be tilted and locked in their support position (FIG. 12b).

Figure 13A:
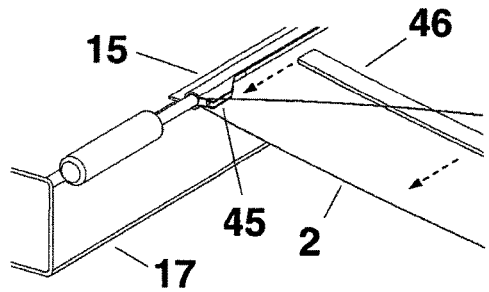
FIGS. 13a and 13b depict are perspective views of the inflatable mirror connected to a support with an alternative connection.
Figure 13B:
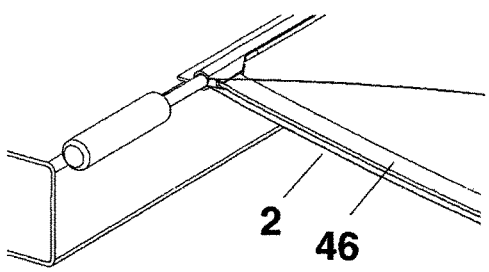
Figure 14A:
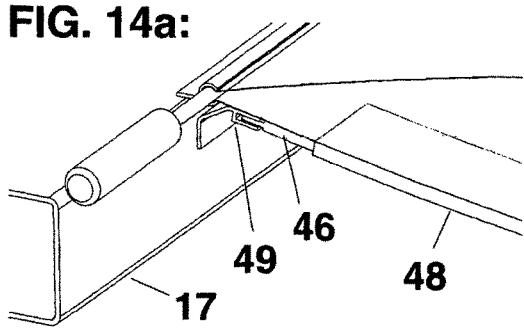
FIGS. 14a to 14d are side views of supports for the reflective sheets.
Figure 14B:
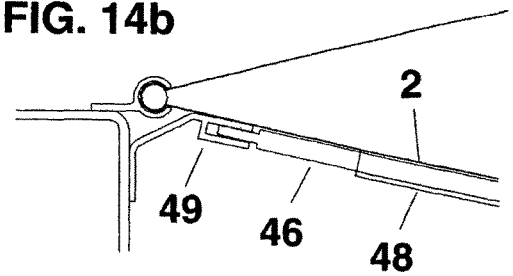
Figure 14C:
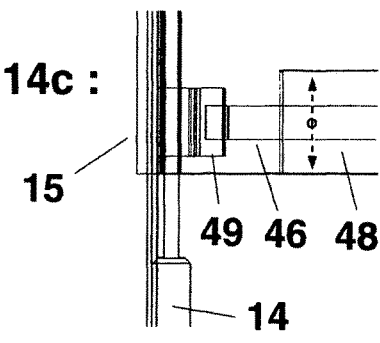
Figure 14D:
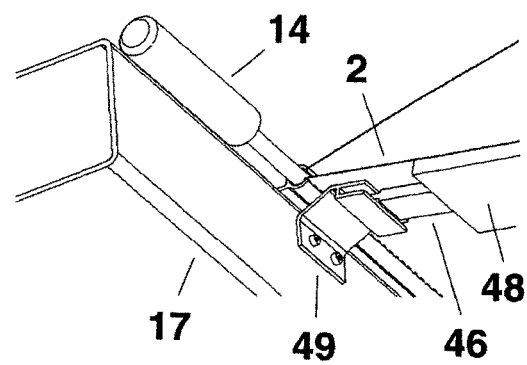

FIG. 13a and FIG. 13b:

Or the reflective sheet 2 may be supported at each end by a simple bow-shaped or elastic-bended member 46 which can simply be slided into a groove on fixing points 45 at the ends of the rope, bar, or rope- or bar-like parts 16. For the assembly of this simple bow-shaped member 46 a temporary opening in the inflatable mirror would be required, which could just be a slot in one of the two sheets of the inflatable mirror which e.g. could then be closed with a piece of special sticky tape after the assembly.

FIG. 14a to FIG. 14d:

Alternatively the reflective sheet may be supported at each end by a simple bow-shaped or elastic-bended elongated (support) member 46 which is located in a pocket 48, which is attached on the outside at the end of the sheet with the reflective surface 2, along the front-end and rear-end of the reflective sheet.

For the assembly the bow-shaped support member 46 can either be slided into this outside pocket 48 through the opening on one end of the pocket, or the pocket may be made in such a way that it can be opened and closed, so that the pocket can simply be closed around the bow-shaped support member e.g. with hook and loop fasteners (Velcro fastening) during the assembly. The ends of the bow-shaped support member may be inserted into brackets 49 which are fixed on the support structure of the inflatable mirror. To allow a small linear movement of the mirror end in longitudinal direction, which is required for the tensioning (and stretching) of the reflective sheet, either the bracket or the pocket, or the bracket and the pocket are made in such a way that they allow a small linear movement of the bow-shaped support member 46 in the direction of the longitudinal axis of the inflatable mirror.

Figure 15A:
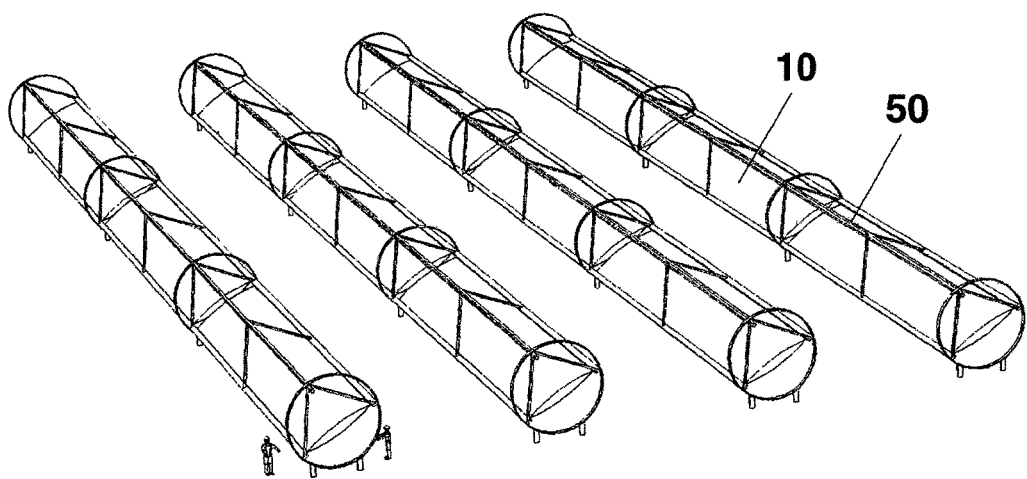
FIGS. 15a and 15b depict mirrors attached to a triangular frame beam.
Figure 15B:
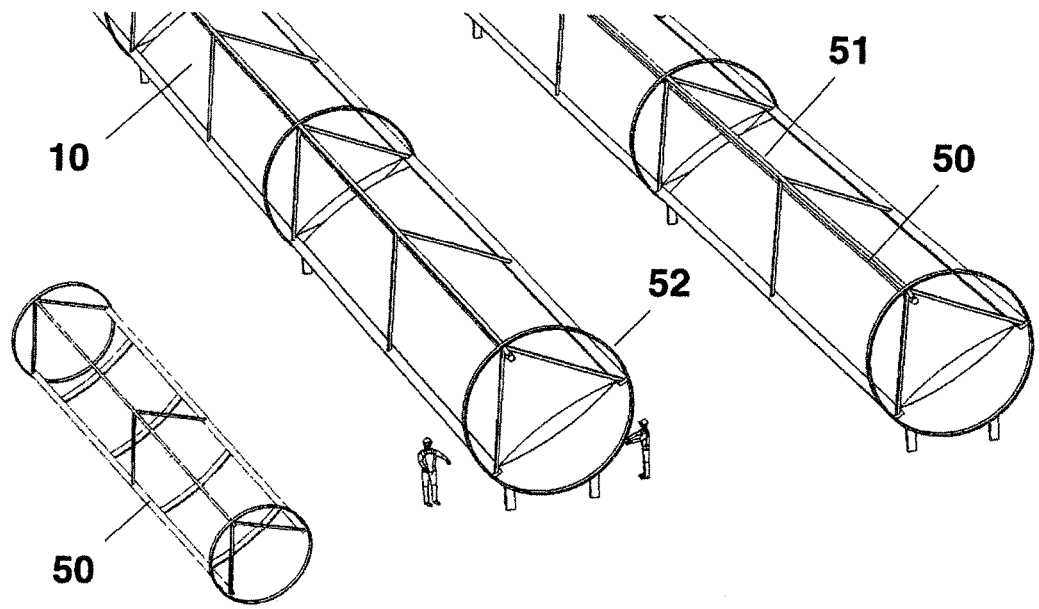

FIGS. 15a and 15b:

One main application for the inflatable light concentrating mirror in accordance with the invention is the use of the inflatable mirror 10 as a solar concentrator. Here the use of the inflatable mirror as a solar concentrator module in a large solar collector field is a particular interesting application for this light-weight and cost-effective mirror type.

The support structure for the inflatable light concentrating mirror may here comprise a light-weight triangular frame beam 50. Here the profile-bars with the C-shaped cross-section 15 which hold the two rims 12 (longitudinal sides) of the inflatable mirror may be fixed to two of the three corner struts of this triangular frame beam 50. And the receiver for the concentrated (or focused) sun-light 51 may be fixed on the thirth corner strut. The receiver for the concentrated sunlight 51 may comprise a device for the absorption and the transformation of electromagnetic radiation, either into electric energy, thermal energy or into chemical energy. (e.g. LGBC photovoltaic cells for electricity generation) The geometry of the light-weight triangular frame beam 50 and the geometry of the inflatable light concentrating mirror 10, especially in reference to the focal distance of the mirror, may be designed in such a way, that the three corner struts can directly be fixed to circular support rings 52. These circular support rings 52 may then be used as bearings for the triangular frame beam and as drive elements for a controlled one-axis rotation of the triangular frame beam 50 around its centre axis, in order to track the sun.

FIG. 16:

Another main application for the light concentrating mirror in accordance with the invention is the simultaneous use of the inflatable mirror 10 as roof element and light concentrating mirror. This is considered to be a very economical application of the inflatable mirror, as the mirror support structure comprises here a roof support structure. The inflatable light concentrating mirror acts here on one hand as a roof element which covers the building and replaces the ordinary roof cover (similar to the ETFE air-cushion roofs made by companies like Vector-Foiltec, Taiyo Kogyo Cooperation, MakMax, BirdAir etc.), and on the other hand the inflatable mirror acts as a fixed (motionless) light concentrating mirror which concentrates the sunlight onto a focus-line. In this application of the light concentrating mirror only the receiver for the concentrated (focused) sun-light 51 moves and is guided along the path of the focusline of the inflatable mirror 10 for a certain number of hours per day, with the help of one or more automatic drive systems. As receiver e.g. vacuum tubes for the production of heat energy or (watercooled) LGBC photovoltaic cells for light concentration factors of 40.times.-100.times., for the production of electricity (& warm water), could be used.

The preferable orientation of this combined light concentrating mirror and roof element is so that the longitudinal axis of the mirror is either orientated in a North-South direction or in an East-West direction.

In this application the time period for the possible use of the light concentrating mirror to generate energy with good efficiency is around plus/minus 3 to 4 hours from noon (6 to 8 hours/day). And the optimal location for a building equipped with this fixed mirrors would be in a sunrich area within approximately plus/minus 30 degree from the equator. The described static concentrator mirror could be used e.g. on large roof structures of factories, storehouses, hangars, halls, car parks etc. etc.

DESIGNATIONS REFERENCE LIST 1 transparent sheet
2 reflective sheet (with mirror-like surface)
3 electromagnetic radiation (e.g. sunlight)
4 in- and outlet→for inflation or deflation of the void between the two sheets
5 air or gas with defined (over-) pressure enclosed in the void
6 reflected (or focused) electromagnetic radiation
7 optical axis or optical plane of the inflatable mirror
8 means for inflating or deflating the mirror by adjusting the pressure in the gas, which is enclosed in the void. These means for inflating or deflating may comprise an automatic device for the generation of a defined pressure in the gas which is enclosed in the void, and which is constantly or temporarily in communication with the void such that a defined overpressure is automatically generated and maintained in the enclosed gas, automatic device: for example an automatic compressor unit which comprises all components required to adjust a defined differential pressure between the air (or gas) enclosed in the inflatable mirror and the surrounding atmospheric pressure. (for example a compressor, a storage tank, valves, pressure gauges etc.), →can additionally include a filter unit and an air (or gas)-dryer unit, to keep humidity and contamination of the air (or gas) inside of the inflatable mirror to a low level
9 support structure (e.g. two support beams or a support frame)
10 inflatable mirror
11 longitudinal tension, or pulling- or tensile force, which is tensioning the reflective sheet 12 longitudinal side (or rim) of mirror, adapted to be attached to a support structure such that the side is movable in a longitudinal direction (e.g. by use a form-fit connection)
13 longitudinal axis of inflatable mirror
14 tensioning means, or tensioning device→configured to provide a pulling force on at least the reflective sheet so as to provide a longitudinal tension in the reflective sheet
15 profile bar (→made from extruded metal or plastic), with a form-fit cross section shape (e.g. C-shaped cross section) on the side which holds the edge of the inflatable mirror
16 rope, bar, or rope- or bar-like part
17 beam, made either of standard merchant bar material with a tube-like, angle-like or channel-like crossection (material: e.g. steel or aluminium alloy), or special manufactured beam-like part made of a plastic or fibre reinforced polymer
18 rivet or screw
19 welding-, gluing- (connection or -process)
20 elastic rope- or bar-like part with a flap- or strap-like extension
21 flap, strap
22 roller
23 elastic strap or elastic bar (with a defined elasticity)
24 profile bar, mounting side having a hook-like shape
25 counterpart with hook-like shape on mounting side (e.g. profile bar or bended panel)→can be an integral part of item 17 (beam)
26 profile bar, mounting side having a form-fitting shape
27 counterpart with form-fitting shape (e.g. profile bar), fixed to beam with rivets or screws→can also be an integral part of item 17 (beam)
28 profile bar with a hinge shape which is lockable (e.g. with a catch), which forms a form-fit cross-section-shape (e.g. C-shape) when closed, on the side which holds the inflatable mirror and which has a hook-like shape on the other side (the mounting side).
29 same as 28 but with a form-fit cross section shape on the mounting side (e.g. T-shape)
30 transparent front side sheet (→on both ends of the inflatable mirror)
31 rear end of inflatable mirror
32 front end of inflatable mirror
33 arrow indicating the stretching (-direction) of the sheet with reflecting mirror-like surface
34 arrow indicating tensile force created by item 14 (device for tensioning of reflective sheet)
35 flap-like extension or flap-like addition on sheet with reflective surface
36 eyelet at the end of item 16 (rope, bar, or rope- or bar-like part)
37 hook at the end of item 16
38 bracket with thread insert or threaded sleeve etc., can be integral part of item 17 (beam)
39 bracket with stud or eyelet→can also be an integral part of item 17 (beam)
40 flat bracket→for fixing of sheet with reflective surface by screws, rivets or by clamping
41 bracket with hook
42 tension spring
43 device for tensioning of sheet with reflective surface, comprising a screw mechanism,
44 device for tensioning of the sheet with the reflective surface, comprising either a hydraulic cylinder, a pneumatic cylinder or a linear electric drive, which can be remote-controlled by an automatic control system, in order to adjust a defined tension in the reflective sheet at any time.
45 Fixing Point→here item 16 is connected to item 2 (sheet with reflective surface) (can be a rigid part (e.g. plastic part) to which items 16 and 2 are glued or welded to)
46 bow-shaped or elastic-bended elongated (support) member (e.g. a bended metal bar)
47 bow-shaped elongated (support) member with a pivot on each end
48 pocket at the front-end and rear-end of the sheet with the reflective surface (a pocket, were bar can be slided in, or a pocket which can be opened and closed e.g. with hook and loop fasteners)
49 bracket for fixing of item 46 (bow shaped support bar) to item 17 (beam)
50 triangular frame beam
51 receiver for the concentrated (focused) electro-magnetic radiation (e.g. sunlight)
52 circular support ring

The invention claimed is:
1. An inflatable light concentrating mirror, comprising:
a first transparent sheet and a second reflective sheet, wherein the first sheet and the second sheet are connected or sealed to each other along longitudinally extending lateral sides to define a void therebetween, said void being adapted to receive a gas to inflate and form the light concentrating mirror,
wherein said longitudinally extending lateral sides are operatively engaged with support structures, to be movable, relative to said support structures, in a longitudinal direction, and
wherein the mirror further comprises a tensioning device connected to the lateral sides of said first and second sheets and adapted to move the lateral sides of the first and second sheets, independent of said support structures, in the longitudinal direction to produce a defined longitudinal tension along the lateral sides to stretch at least the second sheet, such that creases or wrinkles present in the sheet are significantly reduced.
2. The inflatable light concentrating mirror of claim 1, wherein the light concentrating mirror further comprises a device for inflating or deflating the mirror by adjusting the gas pressure within the void.
3. The inflatable light concentrating mirror of claim 2, wherein the device for inflating or deflating the mirror comprises an automatic device for the generation of a defined gas pressure within the void and wherein the device is constantly or temporarily in communication with the void such that a defined overpressure is automatically generated and maintained by the gas enclosed in the void.
4. The inflatable light concentrating mirror of claim 1, wherein the first and second sheets comprising the light concentrating inflatable mirror are made substantially of a flexible polymeric foil.
5. The inflatable light concentrating mirror of claim 4, wherein the flexible polymeric foil is reinforced with fibers.
6. The inflatable light concentrating mirror of claim 4, wherein the first and second sheets of the inflatable mirror comprise a UV-resistant or substantially UV-resistant polymeric material.
7. The inflatable light concentrating mirror as claimed in claim 1, wherein the reflective sheet is supported by a bow-shaped or elastically bent elongated member at each end, to ensure that the reflective sheet at the ends of the inflatable mirror retains its shape.

8. The inflatable light concentrating mirror as claimed in claim 1, wherein fixing the inflatable mirror on the tensioning device or on the support structure is achieved with one or more of hook and eyelet connections, stud and eyelet connection, screw and eyelet connections or with brackets which are fixed with screws, bolts or rivets.

9. The inflatable light concentrating mirror of claim 1, wherein during the longitudinal tension produced by the tensioning device, the distance between the lateral sides is unchanged.

10. An inflatable light concentrating mirror, comprising:
a first transparent sheet and a second reflective sheet, wherein the first transparent sheet and the second reflective sheet are connected or sealed to each other along longitudinally extending lateral sides to define a void therebetween, said void being adapted to receive a gas to inflate and form the light concentrating mirror, said lateral sides are attached to support structures, to be movable, relative to said support structure in the longitudinal direction, and
a tensioning device positioned at the longitudinally extended lateral sides of said first and second sheets, outside of said void disposed therebetween, to move the lateral sides of the first and second sheets in the longitudinal direction, to produce a defined longitudinal tension along the lateral sides to stretch the first and/or second sheet such that creases or wrinkles therein are effectively reduced.

11. The inflatable light concentrating mirror of claim 10, wherein the tensioning device comprises one or more tensioning devices adapted to be attached to at least one mirror end or one free end of the second sheet, wherein the tensioning device is configured to provide a pulling force on the second sheet so as to provide the longitudinal tension.

12. The inflatable light concentrating mirror of claim 11, wherein a pair of tensioning devices are attached to each respective end of the mirror, wherein each tensioning device of each of the pair of tensioning devices are attached adjacent opposing corners of the mirror.

13. The inflatable light concentrating mirror of claim 11, wherein two tensioning devices are attached to a first end of the mirror, each tensioning device being attached to adjacent, opposing corners of the first end, and wherein a second end of the mirror is attached to the support structure.

14. The inflatable light concentrating mirror of claim 11, wherein the tensioning devices are fixed to an intermediate member associated with the reflective sheet.

15. The inflatable light concentrating mirror of claim 11, wherein the tensioning devices each comprise one or more tension springs, compression springs, a screw mechanism, or a remote controlled linear actuator.

16. The inflatable light concentrating mirror of claim 10, wherein the two lateral sides of the inflatable mirror are attached to the support structure essentially with a form-fit connection such that the two lateral sides of the mirror are movable in a longitudinal direction.

17. The inflatable light concentrating mirror of claim 16, wherein the form-fit connection comprises a profile bar having a substantially C-shaped cross-sectional configuration on its side which attaches to the lateral side of the mirror.

18. The inflatable light concentrating mirror of claim 14, wherein the form fit connection further comprises a rope, a bar or a bar-like element either fixed to the inflatable mirror along the outer edge of its lateral side, or essentially fixed or located along the inside edge of its longitudinal side.

19. The inflatable light concentrating mirror of claim 17, wherein the profile bar has a hook-shape or a shape suitable for a form-fit connection on its side which attaches to the support structure.

20. The inflatable light concentrating mirror of claim 17, wherein the profile bar has a hinge shape which is lockable and which forms the C-shaped cross-section when closed on the side of the profile bar which holds the longitudinal side of the inflatable mirror.

21. The inflatable light concentrating mirror of claim 16, wherein the form-fit connection comprises a profile bar having a substantially rectangular C-shaped cross-sectional configuration on its side which attaches to the lateral side of the mirror.

22. The inflatable light concentrating mirror of claim 21, wherein the form-fit connection further comprises a bar or strap with defined elasticity in at least the longitudinal direction, which is fixed to the inflatable mirror along its lateral side, wherein rollers are either fixed on one side or on both sides of the bar or strap, in defined constant distances along the bar or strap, such that only rolling resistance occurs in the form-fit connection during movements of the longitudinal sides of the inflatable mirror in the longitudinal direction.

23. The inflatable light concentrating mirror of claim 10, wherein the support structure of the inflatable mirror comprises a light-weight triangular frame beam having three corners struts, wherein the two lateral sides of the inflatable mirror are attached to two of the three corner struts of the triangular beam, and wherein a receiver adapted to collect and transform light concentrated by the mirror into either electric energy, thermal energy or into chemical energy, is fixed on or in proximity to the third and remaining corner strut.

24. The inflatable light concentrating mirror of claim 23, wherein the three corner struts of the triangular frame beam are fixed to two or more circular support rings which act as bearings and drive elements for a controlled one-axis rotation of the triangular frame beam essentially around its center axis, in order to track the sun.

25. The inflatable light concentrating mirror of claim 10, wherein the support structure comprises a roof support structure, wherein the two lateral sides of the inflatable mirror are attached to two members of the roof support structure and wherein the inflatable mirror acts as a roof cover element and as a fixed and static light concentrating mirror at the same time, and wherein a receiver adapted to collect and transform light concentrated by the mirror, into either electric energy, thermal energy or into chemical energy, is automatically moved along the path of the focus-line of the mirror, for usually a defined time period each day.

26. The inflatable light concentrating mirror of claim 10, wherein the mirror has a rectangular configuration.

\* \* \* \* \*